Feb. 12, 1929.
C. STEINEM
HYDRAULIC SHOCK ABSORBER
Filed Dec. 8, 1926      2 Sheets-Sheet 1
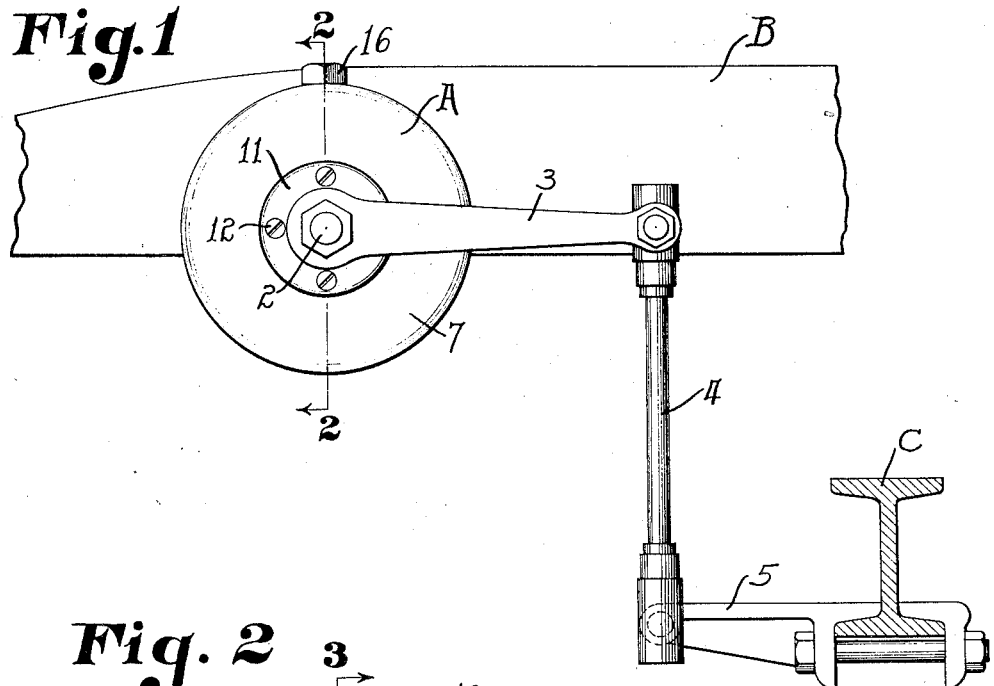
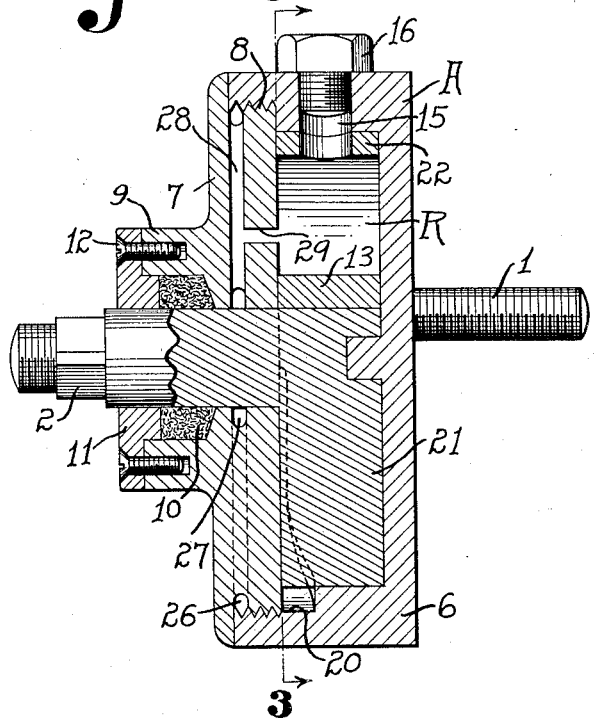
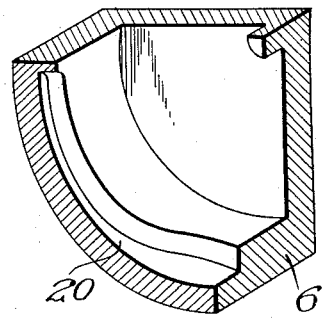
Inventor
Chester Steinem
By
Aven & Aven
Attorneys Feb. 12, 1929.                                         1,701,828
C. STEINEM
HYDRAULIC SHOCK ABSORBER
Filed Dec. 8, 1926          2 Sheets-Sheet 2
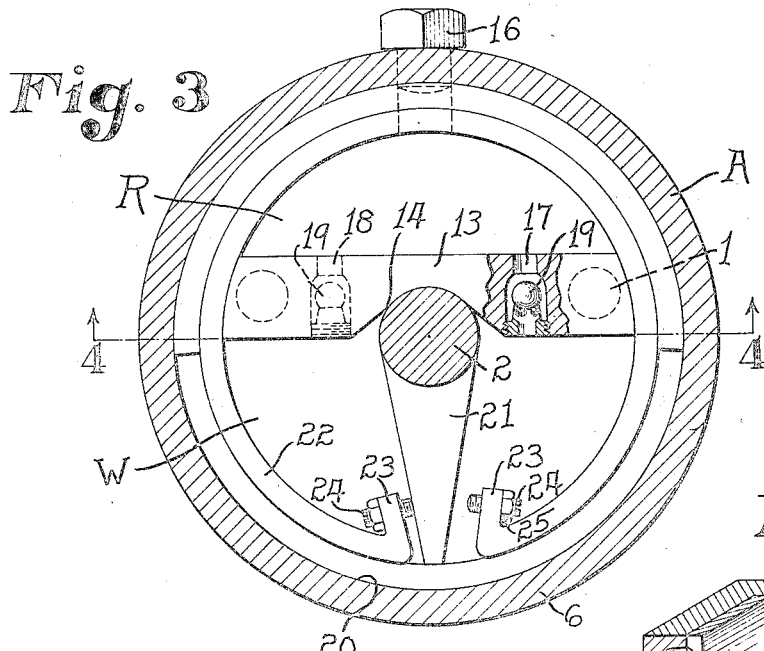
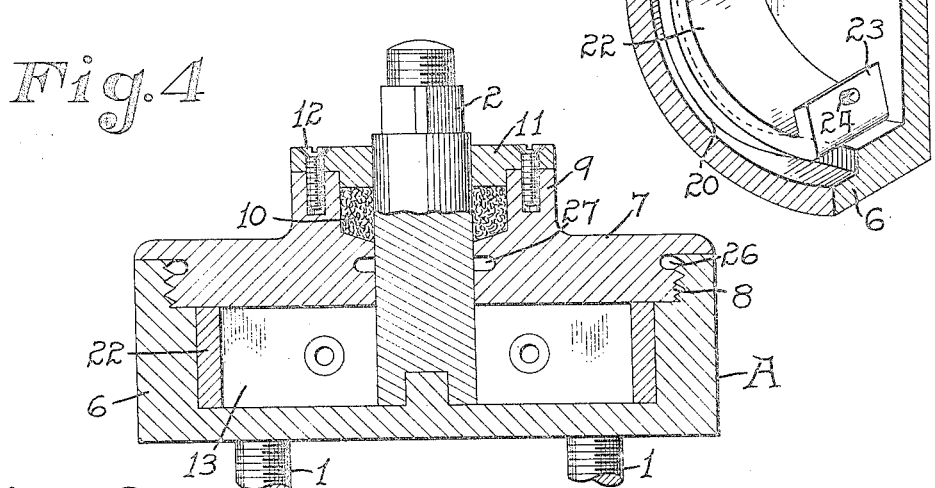
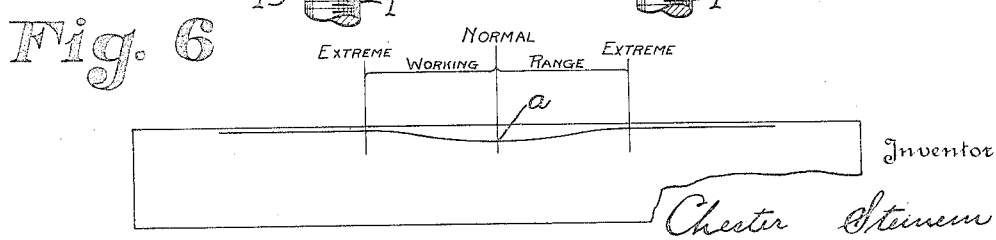

Patented Feb. 12, 1929.

1,701,828

UNITED STATES PATENT OFFICE.

CHESTER STEINEM, OF CINCINNATI, OHIO.

HYDRAULIC SHOCK ABSORBER.

Application filed December 8, 1926. Serial No. 153,251.

This invention relates to fluid controlled braking or checking devices, commonly known as shock absorbers, but more particularly to devices of this type for use on automobiles.

This shock absorber is primarily designed to supplement and control the action of an automobile spring, but may be used on any other vehicle or in any other relation between bodies which are subjected to shocks or vibrations, these being undesirable to have transmitted from one to the other. Broadly, it is an object of this invention to accomplish deceleration at a predetermined diminishing rate and to prolong the end point and avoid "bottoming". It is also an object of this invention to prevent sudden change in acceleration or deceleration of the automobile body in directions other than along its longitudinal axis. It is believed that the motion of an automobile body other than along its longitudinal axis is desirable for enhancing the pleasure of the occupants, but such motion must be limited and controlled so that no sudden change in acceleration takes place. It is further desirable to have a lesser acceleration on the upthrow of the automobile body, as such arrangement provides a feeling of security to the occupants and allows the driver better control of the vehicle, as well as preventing tire wear and skidding.

Other objects of the invention are to provide a fluid checking device constructed to resist increasingly, a force exerted thereon at a decreasing rate; to provide regulation of the throttling action of the shock absorber in accordance with the demands of service, and permit regulation of the throttling action independently in both directions of movement; to provide means for collecting liquid escape from the working chamber, and returning this automatically to the reserve chamber; and to provide a checking device having the new and improved features of construction, arrangement and operation hereinafter described.

When an automobile goes over a road irregularity, the leaf type spring is depressed and the body approaches the axle. A resistance is then set up in my shock absorber of an intensity depending on the rate of depression and increasing as the distance depressed but at a lessening rate of increase, until the accelerating force is equalled. From this point of maximum resistance the velocity of the body relative to the axle gradually decreases, and with it the effective resistance decreases, due to the diminishing velocity of the liquid through the orifices. This gradual decrease in resistance is maintained until the end of the downward movement of the body, where because of very slow movement the resistance is negligible.

All the energy of the body is absorbed by the shock absorber and the autotmobile spring, and upon the return movement the automobile body starts slowly at first with rapid acceleration due to the energy stored in the depressed automobile spring. By means of my shock absorber, the resistance to this upward movement of the automobile body soon reaches a maximum as the upward velocity increases, and from this point gradually decreases as the normal position is reached. The entire cycle is a gentle motion similar to that experienced in going over small irregularities in the road surface and eliminates undesirable features in other shock absorbing devices which give either the effect of being held down or of stiff and inflexible springs.

In one embodiment this invention provides a liquid tight container partitioned into working and reserve chambers, a shaft extending into the working chamber and having a vane or blade oscillatable therein. A curved surface is formed in the working chamber in the region of movement of the vane and is so shaped that relative movement between the curved surface and vane in one direction or the other produces a succession of orifices, each differing from the other in one direction of movement from normal so that each orifice provides an increasing resistance to the flow of liquid, but at a decreasing rate. Means in the form of a split ring employed for adjusting or regulating the sizes of orifices independently in one direction of movement, and in the return so that the throttling action may be adjusted for the particular needs of the service. Means are also provided for automatically returning liquid escaped from the working compartment to the reserve compartment so as to prevent, as far as possible, waste of liquid. One-way valves are utilized between the working and reserve chambers so that a constant supply of liquid is maintained in the working chamber.

For purposes of illustration the invention is shown in the accompanying drawings, in which:

Fig. 1 is a side elevation of my shock absorber showing the manner of attaching to the frame and running gear of an automobile; Fig. 2 is a transverse section on the line 2—2 of Fig. 1; Fig. 3 is a section on the line 3—3 of Fig. 2; Fig. 4 is a section on the line 4—4 of Fig. 3; Fig. 5 is a detail perspective view of a portion of the inside of the working chamber and sleeve; Fig. 6 is a diagrammatic developed view of the inside of the working chamber showing the general formation of the curved surface; and Fig. 7 is a view similar to Fig. 5 with the split sleeve removed.

In the illustrated embodiment of the invention the shock absorber A is provided with rearwardly extending stud bolts 1 for connecting the casing to the frame beam B. Rotatable in the housing of the shock absorber is a shaft 2 and fixed to the outer end of the shaft 2 is an arm 3, which in normal position, may extend substantially parallel to the frame beam B. Connected to the arm 3 and depending therefrom is a link 4 which connects the arm 3 to a clamp 5 secured to the axle C of the automobiles. The above arrangement is well known to those skilled in this art, and further description thereof is deemed unnecessary.

The housing of the shock absorber consists of a cup shaped member 6, the open end of which is closed by a cap member 7 having a screw threaded portion 8, which is screwed into the cup member 6. It will be noted that the cap member 7 is formed with an outwardly extending boss 9, and positioned within the boss 9 and disposed above the shaft 2 is packing 10 held in place by a disc 11 which is connected to the boss 9 by screws 12. It will thus be seen that leakage from the inside of the housing along the shaft 2 is prevented by the stuffing box above described.

The inside of the housing is divided into a working chamber W and reserve chamber R by a partition 13, which may constitute an integral part of the housing. The central portion of the partition is cut away at 14, so as to fit over the shaft 2.

Liquid, such as oil of the desired viscosity is supplied to the working and reserve chambers through the inlet opening 15, which is closed by the headed bolt 16. Communication between the working and reserve chambers is provided by passages 17 and 18 arranged on opposite sides of the shaft 2, these passages being controlled by upwardly seating ball valves 19. It will be seen that normally, the passages between the reserve and working chambers are open so that the oil supply in the working chamber is maintained constant.

An outstanding feature of this invention consists in forming a groove 20 in the curved wall of the housing 6 within the working chamber W. This groove is diagrammatically shown in Fig. 6, and as there shown, the central portion of the groove measured in a direction parallel with the longitudinal axis of the cylinder at $a$ is of considerable depth, and in opposite directions the groove gradually decreases in depth rather abruptly at first, becoming less and less abrupt until at the extreme position the decrease is slight. It is to be noted that both ends of the curved groove in the working range, are convex, while the central portion is concave, the central portion being a compromise to take care of variations of the normal position caused by different loadings of the vehicle (a fewer or greater number of passengers, for example). As shown, the groove 20 extends approximately one-half of the circumference of the inside of the housing 6.

Depending from the shaft 2 and fixed thereto is a vane or piston 21, which is of a width substantially equal to the depth of the inside of the housing, as shown in Fig. 2. In the normal position of the vane 21, it rests over the wider portion A of the countersunk groove or curved surface 20. It will be seen that movement of the vane 21 in either direction from its normal position operates to close one of the check valves 19 and forces liquid from one side of the vane through the countersunk groove 20 to the opposite side; in the normal position the liquid flow from one side to the other of the vane being less restricted.

Assuming that the vane 21 is moving to the right as when the spring is depressed in Fig. 3, the passage will be closed by the check valve 19, and movement at first will be less restricted, but as movement of the vane 21 continues and the depth of the countersunk groove 20 decreases, the resistance to the movement of the vane 21 is correspondingly increased, and as the vane 21 continues its movement the resistance gradually increases, but the rate of increase gradually decreases. It will readily be understood that this action takes place in both directions of movement of the vane 21. It will be further seen that a succession of orifices of varying depths is secured, the depth of each orifice varying with the depth of the countersunk groove 20. The liquid is therefore throttled by orifices, each smaller than the preceding, but not in fixed ratio or increment.

At the end of the stroke of the vane 21, due to the decreasing speed of the automobile body and consequent low velocity of the liquid passing through the countersunk groove 20, the actual resistance is negligible.

When the vane 21 starts to return to its normal position the movement is at first slow, but with rapid acceleration due to the energy in the depressed automobile spring. On the return stroke orifices of the same depth as on the down stroke are passed over, but in reverse order.

In order to permit adjustment of the throttling action of the liquid passing from one side to the other of the vane 21, a rotatable split sleeve 22 fits inside of the housing 6 and the width of the sleeve 22 is substantially equal to the depth of the housing 6. Formed on the ends of the sleeve 22 are upwardly inclined lugs 23, through which extend set screws 24 having lock nuts 25. The lugs 23 are disposed in spaced relation on the opposite sides of the vane 21 and the set screws 24 are adapted to engage one side or the other of the vane. By adjusting the set screws 24 the width of the liquid passage between the lug 23 and vane 21 may be varied. In this manner greater resistance to the movement of the vane 21 in one direction may be provided in relation to the other direction of movement. Ordinarily, the width of the orifices as controlled by the sleeve 22 is less on the up stroke than on the down stroke, thereby giving an increased resistance and less acceleration on the upthrow of the automobile body. It is to be noted that the width of the orifices on one side of the vane 21 may be regulated or adjusted independently to those on the other side, this being accomplished by loosening or tightening one or the other of the set screws 24 in accordance with the demands of service.

In order to collect liquid escaped from the working chamber along the screw threaded connection between the cap 7 and body 6, an annular groove 26 is formed in cap 7; and further to collect liquid escaping along the shaft 2, an annular groove 27 in the cap 7 surrounds the shaft 2. The grooves 26 and 27 are in communication by means of a passage 28, and passage 28 communicates with the reserve chamber R by means of a port 29. In practice, it will be understood that when suction takes place through the passage 17 or 18 by movement of the vane 21 in one direction or the other, liquid collected in the grooves 26 and 27 is drawn into the reserve chamber through the passage 28 and port 29. In this manner, a material saving of liquid is obtained.

It will be seen that I have provided a construction which satisfies the objects enumerated above, and one which constitutes a valuable advance in the art. While I have shown the invention in a certain physical embodiment, it is to be understood that modifications of the structure shown may be made by those skilled in this art without departing from my invention as expressed in the following claims.

What I claim is new and desire to secure by Letters Patent is:

1. A shock absorber having a cylinder, a piston in said cylinder and movable relatively thereto, and a curved surface in said cylinder within the working range of said piston shaped to produce with said piston a succession of orifices providing an increasing resistance to relative movement of said members at a decreasing rate of increase.

2. A shock absorber having a cylinder, parts dividing said cylinder into working and reserve chambers, valve controlled passages in said parts connecting said chambers to permit replenishment of liquid in said working chamber, a vane oscillatable in said working chamber, and a curved surface in said cylinder within the working range of said vane shaped to produce with said vane a succession of orifices providing an increasing resistance to the movement of said vane at a decreasing rate of increase.

3. A shock absorber having a cylinder, a vane in said cylinder movable relatively thereto, liquid in said cylinder, means for replenishing liquid escaped from said cylinder, and a curved surface in said cylinder shaped to produce with said vane an increasing resistance at a decreasing rate of increase to relative movement of said members in both directions from normal position.

4. A shock absorber having a cylinder, a vane in said cylinder and movable relatively thereto, liquid in said cylinder, means for replenishing liquid escaped from said cylinder, a curved surface in said cylinder shaped to produce with said vane an increasing resistance at a decreasing rate of increase to relative movement of said members in both directions from normal position, and adjustable means regulating the liquid flow from one side of said vane to the other.

5. A shock absorber having a cylinder, a vane in said cylinder and movable relatively thereto, liquid in said cylinder, means for replenishing liquid escaped from said cylinder, a curved surface in said cylinder shaped to produce with said vane an increasing resistance at a decreasing rate of increase to relative movement of said members in both directions from normal position, and adjustable means for regulating liquid flow from one side of said vane to the other in both directions of movement, the regulating means on one side of the vane being adjustable independently of the regulating means on the other side.

6. A shock absorber having a cylinder, a vane in said cylinder and movable relatively thereto, liquid in said cylinder, a groove in said cylinder through which liquid passes from one side of the vane to the other with said cylinder when said vane is moved in one direction or the other, and a sleeve in the form of a split ring in said cylinder with the ends thereof disposed on opposite sides of and in spaced relation to said vane and movable in one direction or the other by said vane, said sleeve defining the width of the orifice through which liquid may flow from one side of the vane to the other.

7. A shock absorber having a cylinder, a vane in said cylinder and oscillatable in one direction or the other, liquid in said cylinder, a curved surface in said cylinder shaped to produce an increasing resistance to the movement of said vane at a decreasing rate of increase and a sleeve in the form of a split ring in said cylinder with the ends disposed on opposite sides of and in spaced relation to said vane and movable in one direction or the other by said vane, said sleeve defining the width of the orifice through which liquid flows from one side of said vane to the other.

8. A shock absorber having a cylinder, a vane oscillatable in said cylinder, liquid in said cylinder, parts dividing said cylinder into working and reserve chambers, valve controlled passages connecting said chambers, the valve on one side opening to establish communication between said chambers when said vane is moved in a direction away from said valve, a curved surface in said cylinder shaped to produce with said vane an increasing resistance to the movement thereof in one direction or the other from normal position but at a decreasing rate of increase, and a sleeve in the form of a split ring in said cylinder with the ends disposed on opposite sides of said vane and movable in one direction or the other by said vane, said sleeve defining the width of the orifice through which liquid flows from one side of the vane to the other.

9. A shock absorber having a cylinder, a vane oscillatable in said cylinder, liquid in said cylinder, a curved surface in said cylinder shaped to produce with said vane a succession of orifices providing an increasing resistance at a decreasing rate of increase to the movement of said vane in one direction or the other from normal position, a sleeve in the form of a split ring in said cylinder with the ends disposed on opposite sides of and in spaced relation to said vane, and movable in one direction or the other by said vane, and adjustable members on the end portions of said sleeve and engageable with said vane for adjusting the width of the orifice through which liquid flows from one side of the vane to the other.

10. A shock absorber comprising a cylindrical housing, a cap screwed into one end of said housing, parts dividing said housing into working and reserve chambers, valve controlled passages connecting said chambers, liquid in said chambers, a shaft extending into said housing, a vane fixed to said shaft and oscillatable in said working chamber, said cap having an annular groove around said shaft and an annular groove contiguous to the threaded connection between said cap and housing, and a passage connecting said grooves and a port connecting said passage and reserve chamber, whereby liquid escaped from the working chamber may be returned to the reserve chamber by a suction in said reserve chamber created by the movement of said vane in one direction or the other.

In testimony whereof I have hereunto signed my name to this specification.

CHESTER STEINEM.